United States Patent [19]

Kobayashi et al.

[11] Patent Number: 5,414,739
[45] Date of Patent: May 9, 1995

[54] TRANSMISSION SYSTEM CONSTITUTED OF MULTISTAGE REPRODUCTION NODES

[75] Inventors: Naoya Kobayashi, Musashino; Yoshitaka Takasaki, Tokorozawa; Sadao Mizokawa; Hisayuki Maruyama, both of Katsuta; Hiroshi Mabuchi, Hitachi; Eiichi Amada, Tokyo, all of Japan

[73] Assignees: Hitachi, Ltd.; Hitachi Cable, Ltd., both of Tokyo, Japan

[21] Appl. No.: 974,992

[22] Filed: Nov. 12, 1992

[30] Foreign Application Priority Data

Nov. 12, 1991 [JP] Japan .................. 3-295475

[51] Int. Cl.6 .................. H04L 7/00; H04L 25/36; H04L 25/40
[52] U.S. Cl. .................. 375/371; 375/342; 375/354; 370/105.3; 370/108
[58] Field of Search .................. 375/94, 95, 106, 110, 375/118; 370/105.3, 108

[56] References Cited

U.S. PATENT DOCUMENTS

| | | | |
|---|---|---|---|
| 3,699,554 | 10/1972 | Jones | 375/94 |
| 3,825,844 | 7/1974 | Peterman et al. | 375/95 |
| 4,435,825 | 3/1984 | Tomooka | 375/113 |
| 4,876,700 | 10/1989 | Grindahl | 375/87 |

FOREIGN PATENT DOCUMENTS

| | | |
|---|---|---|
| 50-132809 | 10/1975 | Japan . |
| 52-56810 | 10/1977 | Japan . |
| 61-182343 | 8/1986 | Japan . |
| 62-243449 | 10/1987 | Japan . |

OTHER PUBLICATIONS

Byrne & Karafin et al "Systematic Jitter in a Chain of Digital Regenerators" Bell System Technical Journal vol. 42 pp. 2679-2714 Nov. 1963.

Primary Examiner—Stephen Chin
Assistant Examiner—Amanda Le
Attorney, Agent, or Firm—Antonelli, Terry, Stout & Kraus

[57] ABSTRACT

A transmission system which includes a plurality of reproduction nodes connected to each other in a cascade connection via a communication line. Each node includes a timing extraction circuit for extracting a timing signal from a signal received via the communication line, a discriminating circuit for converting the received signal into a digital signal according to the timing signal, and a processing circuit for processing, based on the timing signal, the digital signal outputted from the discriminating circuit and outputting the processed digital signal to the communication line. The timing extraction circuit includes a signal delay unit for supplying the timing signal with a signal delay time greater than a delay time occurring in the processing circuit.

4 Claims, 7 Drawing Sheets

TRANSMISSION SYSTEM CONSTITUTED OF MULTISTAGE REPRODUCTION NODES

BACKGROUND OF THE INVENTION

1. Field of the Invention

The present invention relates to a transmission system using a subordinate synchronization method, and in particular, to a transmission system including multistage reproduction nodes capable of suppressing accumulation of alignment jitter which directly exerts influence upon occurrence of data errors.

2. Description of the Related Art

In a transmission system constituted of a plurality of reproduction nodes connected in series to each other via a transmission path in which each node includes a timing extraction circuit for extracting a timing signal from an input signal received from the transmission path and a logic circuit (digital signal circuit) for converting the input signal into a digital signal according to the timing (clock) signal extracted by the timing extraction circuit, communicating the digital signal with a terminal (data processor) connected thereto, and transmitting the digital signal to a subsequent node, there has been an essential technological problem of suppressing accumulation of jitter.

Prior technologies related to this problem are as follows, for example.

(1) In the JP-A-61-182343, there has been proposed a transmission system in which a delay element having a delay time equal to a delay time taking place in the digital signal circuit (to be referred to as a logical delay time in this specification herebelow) is inserted in the timing system of each node, thereby suppressing accumulation of alignment jitter which is a relative jitter between the jitter of the received signal and that of the clock signal.

(2) The JP-62-243449 has proposed a multistage repeater using a phase-locked loop (PLL) in the timing extraction circuit in which the circuit designing is conducted to prevent a response delay time $\tau$ of the PLL from being coincident with a delay time $t$ occurring in the logic circuit, thereby implementing a transmission system preventing the accumulation of alignment jitter.

(3) In the JP-A-50-132809 and JP-A-52-56810, there has been proposed an idea in which intervals between input and output electrodes formed in a comb shape in a surface acoustic wave (SAW) filter employed as a timing extraction filter are designed so as to increase a propagation path of the surface acoustic wave to develop a fixed signal delay, thereby suppressing accumulation of systematic jitter.

In the actual application, however, it is difficult to set the delay value of the delay element inserted in the timing extraction circuit of each node to be completely equal to the value of the delay time of the logic circuit as proposed in the prior art (1) above. Moreover, it is quite inconvenient for the production of the node device to adjust, each time the signal delay quantity of the logic circuit is altered due to the modification in the design of nodes, the delay time of the timing extraction circuit to match the logical delay.

In general, since the logical delay time cannot be easily reduced to an arbitrary value, in the conventional technology (2) in which the logic delay is prevented from being coincident with the response delay of the PLL to suppress accumulation of alignment jitter, there is adopted a method in which delay means is inserted in the logic circuit to increase the logic delay time or a method in which the filter characteristic Q of the timing extraction circuit is changed to shift the response delay time of the PLL. In this case, a value (to be referred to as an equivalent logical delay herebelow) obtained by subtracting the delay quantity of the timing extraction circuit from the logical delay time becomes to be positive.

According to the prior art (2) above, however, a problem appears in the system designing stage as follows. Namely, when the logical delay quantity is increased for the suppression of jitter, the signal transmission delay becomes to be greater in the entire repeater system. On the other hand, when the filter characteristic Q is increased, the response time constant of the timing system is also becomes to be larger. Consequently, the follow-up characteristic of the signal response is deteriorated and the characteristic of phase change with respect to temperature also becomes to be worse. Conversely, when the value Q is minimized, the system becomes to be easily influenced from noises outside the base band, which causes a wrong tuning and an increase in random jitter.

That is, according to the prior art (2), to suppress accumulation of alignment jitter, it is necessary to greatly alter designing parameters such as the value Q of the timing extraction circuit and the delay quantity of the logic circuit. This leads to a problem that characteristics of the respective circuits cannot be easily optimized. Furthermore, in the conventional technology above, there has not been clearly described any guideline for values of the designing parameters to suppress the accumulation of jitter to the minimum value. Consequently, each designer is required to experimentally find out parameters which effectively suppress alignment jitter.

In accordance with the prior art (3), since a fixed delay value is used for each SAW filter, when the delay quantity of the logic circuit is altered for some reasons such as a change of designing thereof, a new designing of the SAW filter is required to suppress the accumulation of jitter. In this connection, since the object of the invention (3) is to suppress accumulation of systematic jitter, accumulation of alignment jitter due to the logical delay and relationships between the fixed delay quantity and the logical delay quantity for suppression thereof have not been fully discussed.

SUMMARY OF THE INVENTION

It is therefore an object of the present invention to provide a transmission system including multistage reproduction nodes capable of suppressing accumulation of alignment jitter.

Another object of the present invention is to provide a transmission system including multistage reproduction nodes capable of effectively preventing accumulation of alignment jitter without extremely changing designing parameters respectively of the logical circuit and the timing extraction circuit.

Still another object of the present invention is to provide a node device for the subordinate synchronization method in which accumulation of alignment jitter can be suppressed and of which the circuit can be easily designed and manufactured.

In order to achieve the objects above, a transmission system including multistage reproduction nodes according to the present invention is provided including a timing extraction circuit in each node, the circuit having fixed or variable signal delay means possessing a delay value larger than the signal delay value of the logical circuit.

According to another aspect of the transmission system of the present invention, in each node, the equivalent logical delay obtained by subtracting the delay quantity of the timing extraction circuit from the logical delay time has a negative value.

According to the present invention, signal delay means having a relatively large delay value is inserted in an input or output side of the timing extraction circuit to obtain a negative value for the equivalent logical delay, thereby constructing a transmission system having in principle little accumulation of alignment jitter, which will be described later. Moreover, in accordance with the present invention, such designing parameters as the value Q of the timing extraction filter and the delay quantity of the logic circuit need not be altered to suppress accumulation of alignment jitter. With a simple structure, there can be obtained an effect which is equivalently the same as that developed when each node has a logical delay sufficiently apart from the response time constant of the timing system. The delay time of the delay means connected to the timing circuit is not necessarily required to be equal to the value of the logical delay quantity. Furthermore, in a case of a variable delay element, even when the logical delay quantity is changed to a considerable extent, the setting value of the variable delay element can be easily varied, thereby realizing a flexible system designing.

The foregoing and other objects, advantages, manner of operation and novel features of the present invention will be understood from the following detailed description when read in conjunction with the accompanying drawings.

DESCRIPTION OF THE PREFERRED EMBODIMENTS

Referring now to the drawings, description will be given of an embodiment according to the present invention.

Figure 1:
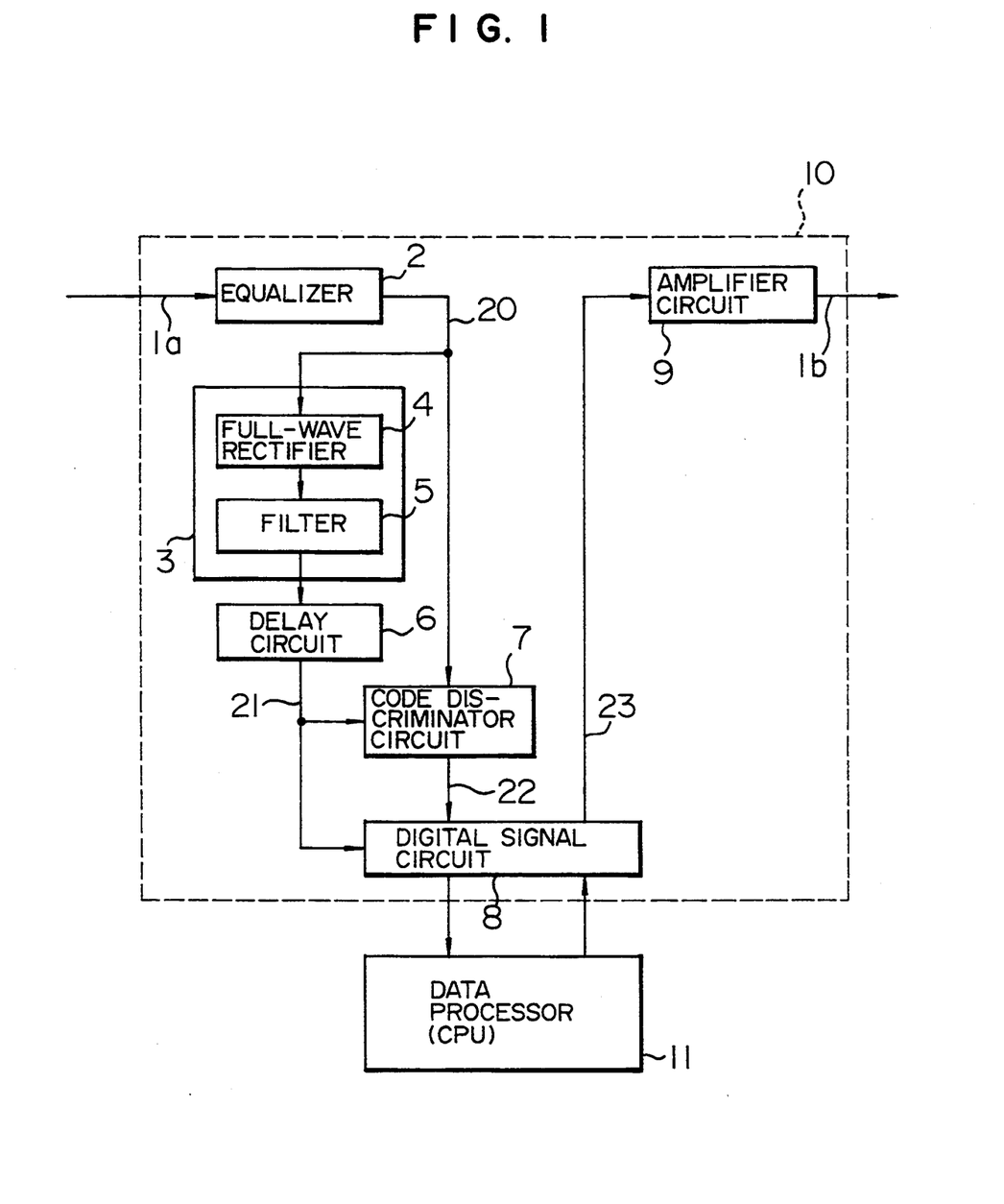
FIG. 1 is a diagram showing the constitution of a reproduction repeater node constituting a transmission system in an embodiment according to the present invention.

FIG. 1 shows the structure of a reproduction node (reproduction repeater) 10 constituting a transmission system in an embodiment according to the present invention. The transmission system includes a cascade connection of a plurality of reproduction nodes 10 connected to each other via communication lines 1 (1a and 1b).

In this embodiment, for convenience of explanation, a communication line (an input line) on an input side of each reproduction node and a communication line (an output line) on an output side thereof are denoted as 1a and 1b respectively. It is assumed that data signals encoded through an alternate mark inversion (AMI) are employed for communications between the reproduction nodes.

The reproduction node includes an equalizer 2 connected to the input line 1a, a timing extraction circuit 3 for extracting a timing signal 21 from an output (analog) signal 20 from the equalizer 2, a delay circuit connected in series to the input or output side of the timing extraction circuit 3, a code discriminator circuit (analog/digital (A/D) converter) 7 for transforming the output signal from the equalizer 2 into a digital signal, a digital signal (logic) circuit 8 for processing an output (digital) signal 22 from the converter 7 at a timing synchronized with the timing signal 21, and an amplifier circuit 9 for amplifying an output signal 23 from the logic circuit 8 and transmitting the obtained signal onto the output line 1b. A reference numeral 11 indicates a data processor or a central processing unit (CPU) connected to the reproduction node 10 for communicating reception and transmission data with the logic circuit 8.

Output data delivered from a reproduction node 10' in a preceding stage is sent to the communication line 1 in synchronism with the clock signal extracted by the timing extraction circuit 3 of the node 10' and is then supplied via the input line 1a to the equalizer 2 of the reproduction node 10. The data signal fed to the equalizer 2 generally contains timing jitter accumulated in the preceding nodes.

The equalizer 2 removes distortion of the signal waveform caused due to transmission characteristics of the communication line 1, thereby shaping the signal waveform and removing an inter-symbol interference. However, it is difficult to implement an equalizer having an ideal waveform shaping characteristic. In general, the inter-symbol interference cannot be completely removed by the equalizer. Namely, the output signal 20 from the equalizer 2 contains, in addition to the inherent data signal components, an echo component delayed in time. Consequently, distortion still remains in the output signal 20. The signal distortion in turn causes jitter in the timing extraction circuit 3.

Since the AMI signals are assumed to be processed in this embodiment, the signal 20 outputted from the equalizer 2 together with the echo is bipolar and hence the timing component cannot be extracted without changing the signal 20. For this purpose, the output 20 from the equalizer 2 is converted by a full-wave rectifier 4 into a unipolar signal having the timing component.

The signal is then inputted to a timing extraction filter 5 to extract therefrom a clock signal (component of a particular frequency) synchronized with the timing of the node in the preceding stage. That is, through the timing extraction filter 5, a signal component of quite a narrow band (monotone in an ideal state) is extracted as the timing signal. The signal thus obtained by the timing extraction filter 5 has a period coincident with the timing of the preceding node. A zero-cross point thereof is used as a judge timing of the data signal. According to the present invention, as the timing extraction circuit 3, there can be employed any known arbitrary circuit configuration including a tank circuit, a phase-locked loop (PLL), or an SAW filter.

In accordance with the present invention, the system is characterized by including on the input or output side of the timing extraction circuit 3 a fixed or variable delay circuit (or a delay element) 6 developing a signal delay time D greater than the delay time (logical delay M) of the logic circuit 8.

The delay circuit 6 provides a delay time D which is an integral multiple of an interval T between signal bits. According to the present invention, the timing signal 21 (a signal of a narrow band outputted from the filter 5) is remarkably delayed by the delay circuit 6 such that the value of the equivalent logical delay time attained by subtracting the delay quantity D of the delay element 6 from the logical delay time M becomes to be negative, thereby suppressing in principle accumulation of alignment jitter. Details thereabout will be described later.

In this regard, since the delay circuit (element) 6 is generally associated with a propagation loss and a phase deviation, it is not favorable to set the delay time D for the delay circuit 6 to be extremely larger than the designing delay time M of the logic circuit 8. In an ordinary reproduction node, the maximum logical delay time M developed in the logic circuit 8 is represented in terms of about 200 bits to about 300 bits. In consequence, as a guideline of designing the delay circuit 6, the value need only be set to be slightly larger than the actual designing value of the logical delay M of each node (by a period of time in terms of from several bits to several tens of bits). The delay time of the delay circuit 6 is at most about three microseconds ($\mu s$) when the reproduction node 10 has a data transmission speed of, for example, 100 Mbps.

In the transmission system according to the present invention in which the delay circuit 6 above is inserted in the timing extraction circuit 3, accumulation of alignment jitter can be suppressed to a satisfactory extent for the actual operation. The output data 20 from the equalizer 2 is restored by the converter circuit 7 into a digital signal 22 according to the clock timing 21 thus delayed. The resultant digital signal 22 is processed in the logic circuit 8 to be outputted as a data signal 23 having a delay of the logical delay time attained by the logic circuit 8, namely, M time slots (=time of M bits). The obtained signal is amplified by the amplifier 9 to be transmitted via the output line 1b to a reproduction node 10" in the next stage.

Subsequently, referring to FIGS. 2, 3A, 3B, 4, 5, 6, 7A, and 7B, description will be given in detail of the effect of the delay circuit 6 for suppressing accumulation of alignment jitter.

First, for easy understanding of the present invention, the kinds of jitter occurring in the multi-stage production repeater system and the technological background of the present invention will be briefly described.

Timing jitter appearing in a reproduction node operating according to the subordinate synchronization method is classified into a random jitter caused by a noise in the transmission path or the like, a pattern jitter (systematic jitter) depending on a pattern of series of data signals, and an alignment jitter occurring in association with a phase difference between the signal system and the timing system.

The random jitter is caused by a noise in the transmission path, a noise of a receiver, a miss-tuning, etc. The accumulated quantity thereof is of a magnitude proportional to (number of repeater nodes)$^{\frac{1}{2}}$ and hence is ordinarily negligible in most cases.

The pattern jitter is caused when the phase of a signal containing an echo caused by residue of equalization or the like is varied (amplitude phase conversion) at a change point of a data pattern through a nonlinear operation such as a full-wave rectification in the timing extracting unit 3. The mean amplitude thereof is increased substantially in proportion to the number of repeater nodes. In the following description, the pattern jitter thus accumulated is called an absolute jitter. However, in the input line 1a of the reproduction node, the phase of the signal system is completely coincident with that of the timing system. Consequently, by disposing a buffer on the side of the input line of the master node (the reproduction node located at the highest position of the multistage connection), the absolute jitter can be absorbed.

The alignment jitter is caused when the phase of the signal system is shifted from that of the timing system due to the filter response delay of the timing extraction circuit 3. This jitter cannot be compensated for by the buffer disposed in the master node as described above. It has been known that the alignment jitter most directly exerts influences upon the data error occurring in the actual transmission system.

The inventors of the present invention have experimentally and theoretically confirmed that the transmission delay due to the signal logic processing executed in each reproduction node, namely, the logical delay is the primary cause of accumulation of the alignment jitter and that when the logical delay time is in the proximity of the response time constant of the timing extraction filter, the alignment jitter is accumulated to the maximum extent.

Next, behavior of accumulation of alignment jitter will be described. Particularly, clarifying the fact that the accumulation of alignment jitter develops the maximum value when the logical delay time is in the proximity of the response time constant of the timing extraction filter, description will be given of the effectiveness of the present invention.

Figure 2:
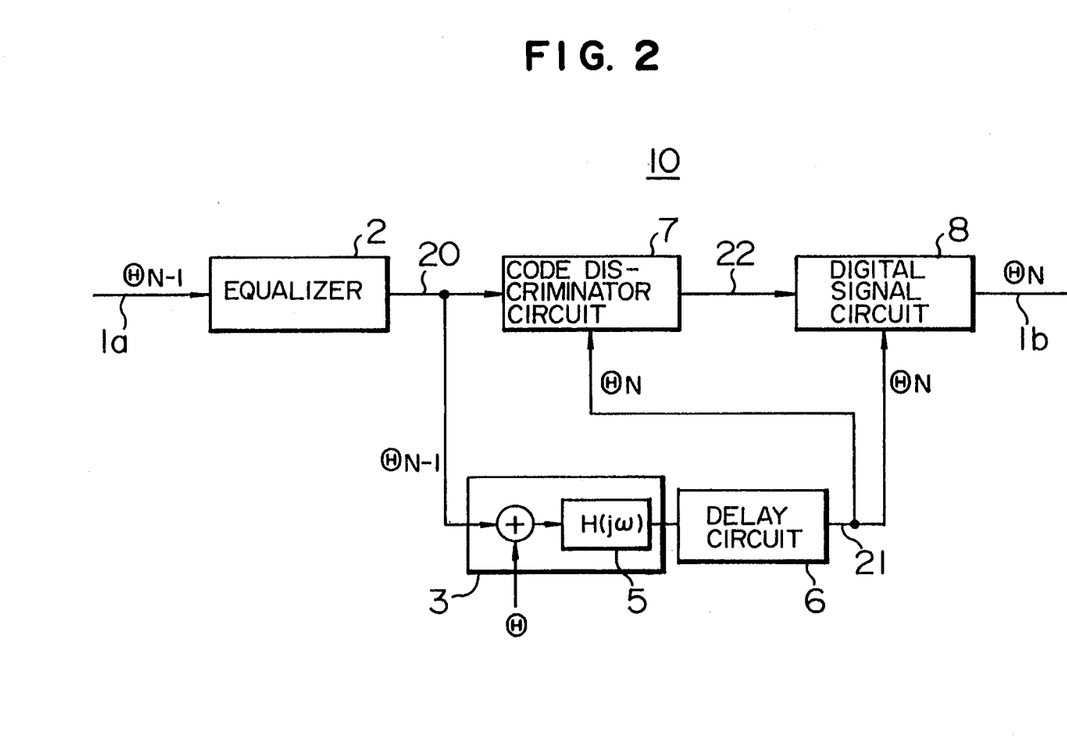
FIG. 2 is a diagram showing an analysis model for analyzing jitter accumulated in the reproduction repeater node of the present invention.

FIG. 2 shows a model of a reproduction node having a logical delay prepared to analyze the jitter accumulation in the reproduction node of FIG. 1. As the basic model for the analysis of jitter accumulation, there has been adopted a Chapman's model described in pages 2679 to 2714 of the "Bell System Technical Journal", Vol. 42, November 1963.

In FIG. 2, a signal sent from a reproduction node 10' in a previous stage ((N−1)-th stage) to an input line 1a is received together with an absolute jitter $\theta N-1$ by the reproduction node 10 in the N-th stage. In an actual system, the received signal contains a random jitter, which however exerts only a little influence as described above. Consequently, ignoring the effect of the random jitter, only the absolute jitter and the alignment jitter will be described.

The received signal undergoes a waveform shaping in an equalizer 2 and is then restored by a discriminating circuit 7 into digital data. A logic circuit 8 processes an output 22 from the circuit 7 at a clock timing delayed by a delay time D having a value larger than the logical delay M resultant from operations respectively of a timing extraction circuit 3 and a delay circuit 6.

In the timing extraction circuit 3, $H(j\omega)$ is a function representing a propagation characteristic of jitter and is generally called a jitter transfer function. The function is formed, according to a frequency characteristic (ordinarily, a band-pass characteristic) of the timing extraction filter 3, by paying attention only to the jitter thereof. Equivalently, the obtained function is subjected to a frequency shift to the base band. According to the Chapman model, the frequency characteristic of the jitter transfer function is approximated to a low-pass characteristic of order 1 as $$H(j\omega) = 1/(1 + \omega/B) \quad (1)$$

where, B stands for a half-power level (for a frequency band associated with amplitude attenuation of 3 dB) of the jitter filter function. Assuming a repetition frequency of pulse and a quality factor of the timing extraction filter to be respectively $\omega 0$ and Q, the half-amplitude level B is expressed as follows.

$$B = \omega_0/2Q \quad (2)$$

In FIG. 2, the full-wave rectifier circuit 4 of FIG. 1 is missing. However, paying attention to jitter, the system can be equivalently regarded as a model in which a step function with a magnitude $\theta$ is applied to the timing extraction circuit 3. In this situation, in the N-th reproduction node 10, the value of absolute jitter of the timing clock signal is increased by $\theta$ so as to be contained as $\theta N$ in the timing signal 21. Relationships between $\theta N$ and $\theta N-1$ are represented as $$\theta_N = (\theta_{N-1} + \theta_c - j\omega(N-1)MT)H(j\omega) \quad (3)$$

where, $\theta$ denotes a systematic jitter, T indicates an interval of the repetition frequency of pulse, M stands for a logical delay (in the unit of time slots (TS)), and $H(j\omega)$ designates the jitter transfer function. The expression (3) namely represents accumulation of pattern jitter.

On the other hand, the alignment jitter $\theta AN$ is a phase difference between the signal system and the timing system and is equivalently represented as the discrepancy $\theta N - (\theta N - 1)$ between the input and output values of absolute jitter in FIG. 2. This leads to the following expression.

$$H^A(j\omega) = H^A(j\omega) + \sum_{i=1}^{N-1} Hi(j\omega)\{e^{j(i-N)\omega MT} - e^{j(i-N+1)\omega MT}\} \quad (4)$$

In the expression (4), $HA(j\omega)$ stands for a propagation characteristic of the alignment jitter, which will be called an alignment jitter transfer function herebelow. Assume the step response of the expression (4) to be hs(t). The function hs(t) is expressed as $$hs(t) = h_N(t) + \sum_{i=1}^{N-1} \{hi(t - (N - i)MT) - hi(t - (N - i - 1)MT)\} \quad (5)$$

where, hN(t) and hi(t) are responses of nodes respectively in the N-th and i-th (i=1 to N−1) stages. The function hi (t) is represented as follows.

$$hi(t) = 1 - e^{-Bt} \sum_{k=1}^{i} \frac{(Bt)^{i-k}}{(i-K)!} \quad (6)$$

In the expression (5), the second term on the right side thereof stands for a jitter increment caused by the logical delay M. The quantity thereof will be called accumulation of logical delay difference herebelow.

Figure 3A:
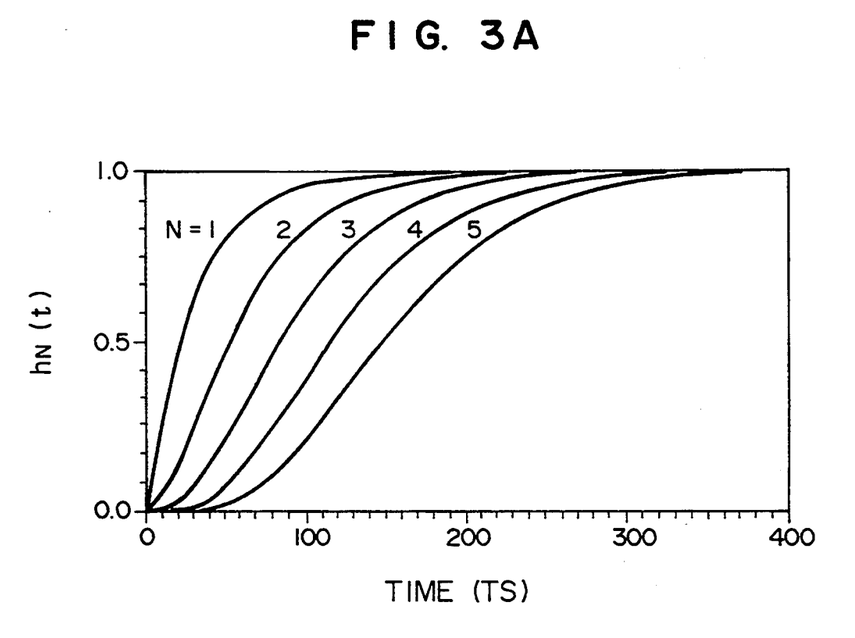
FIGS. 3A and 3B are graphs showing examples of computed results of step response waveforms of an alignment jitter transfer function for explaining the principle of accumulation of alignment jitter.
Figure 3B:
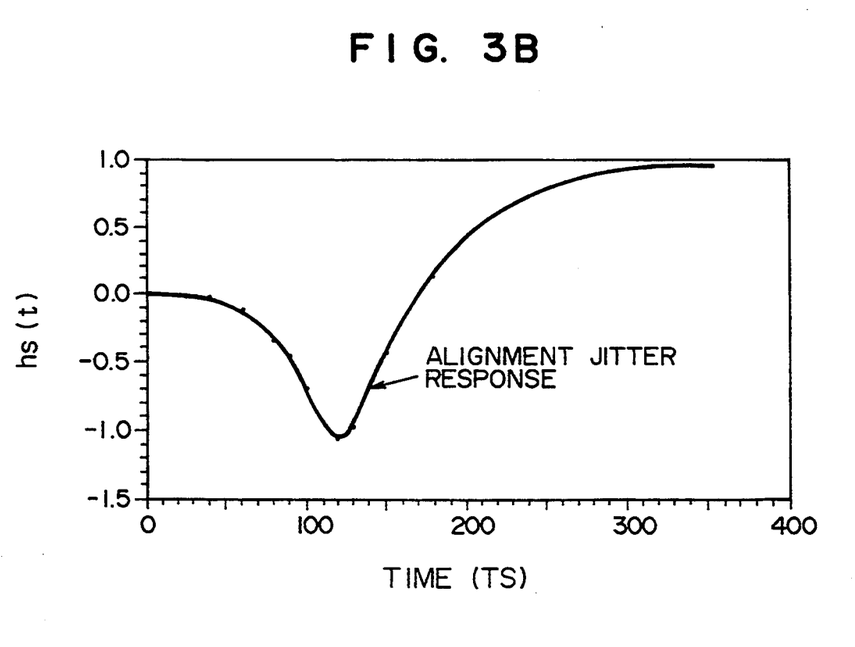
Figure 4:
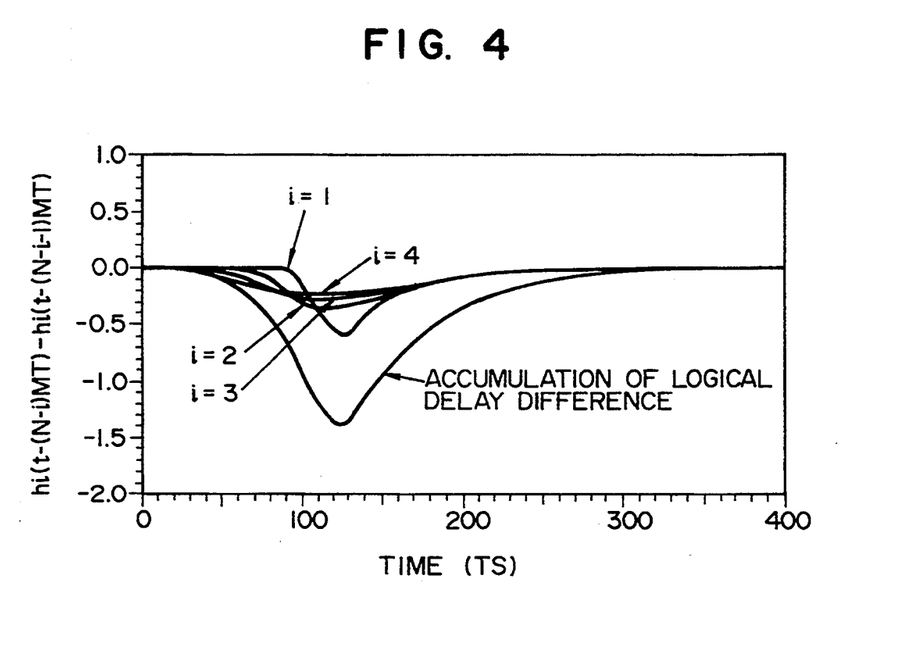
FIG. 4 is a graph showing an example of computed results of accumulation of logical delay difference for explaining the principle of accumulation of alignment jitter.

FIGS. 3A and 3B are graphs schematically showing the response characteristics hN(t) and hs(t) for N=5. The calculated results are attained by assuming Q=100, $\omega_0=1$, and M=32 (TS) in the model of FIG. 2. The value of M is set to be equal to the response time constant of the jitter transfer function. Moreover, FIG. 4 shows an example of computed results in which the accumulation of logical delay is calculated for the identical parameter values.

As can be seen from FIGS. 3A and 3B, the alignment jitter accumulation is conceptually caused by an increase in the accumulation of logical delay difference. Furthermore, the accumulation of logical delay difference is most increased, depending on the value of M, when the peak of the difference of hi(t) is added in an in-phase operation for all values of i ($\geq 2$). Actually, with the response time constant set to 32 (TS), the accumulation of logical delay difference takes the maximum value. Consequently, the accumulation of alignment jitter is also most enhanced. In this connection, it will be later proved that the accumulation of jitter becomes to develop the maximum value under the condition above.

Determining, based on the second term of the right side of the expression (5), a condition under which the absolute value of the accumulation of logical delay difference develops the maximum value, there is attained the following expression.

$$f(i,a) = e^{\frac{a}{i}} + e^{\frac{a}{1-i}} = 2 \quad \text{for all } i (\geq 2) \quad (7)$$

where, a is equal to BMT and B is the half-power level of the jitter transfer function of the expression (1).

Figure 5:
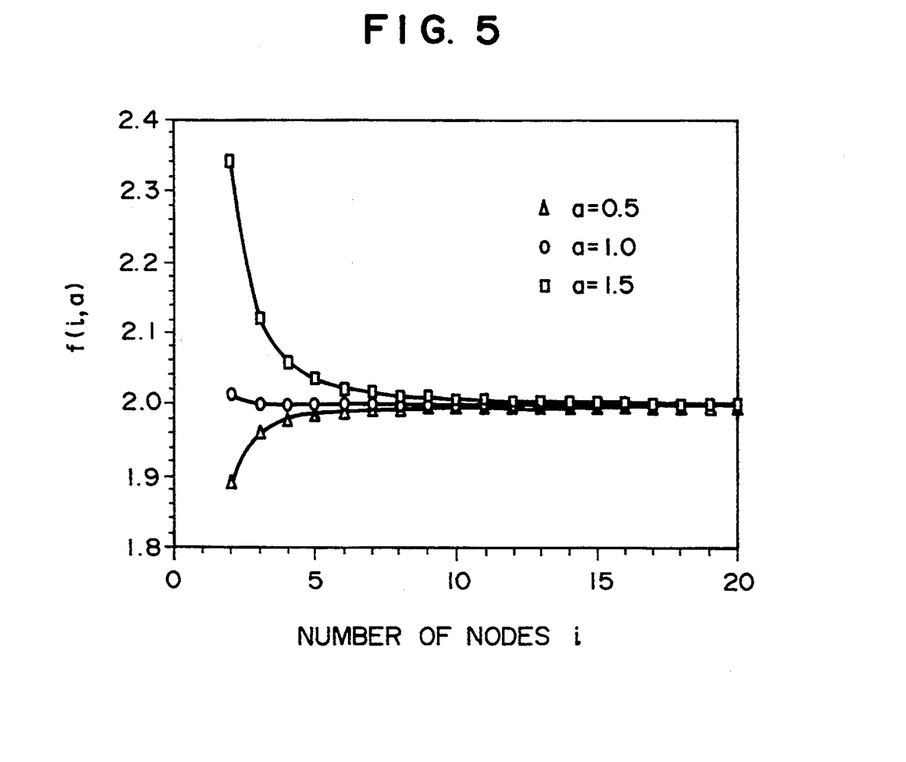
FIG. 5 is a graph showing a condition under which accumulation of alignment jitter takes a maximum value.

As can be seen from the graph of FIG. 5, for a $\approx 1$, namely, $M \approx 1/BT = Q/\pi$ (=theoretical response time constant $\tau$ (TS) of jitter transfer function), the condition above is substantially satisfied for all values of i ($\geq 2$).

FIG. 5 shows results obtained by computing the function f(i,a) of the expression (7) as a function of i with a being assumed to be a parameter. According to this graph, it is to be understood that the expression (7) is almost satisfied when the value of a is in the proximity of one. That is, in this situation, the accumulation of logical delay difference is also increased toward the negative direction. Resultantly, the accumulation of alignment jitter becomes to be the maximum value. On the other hand, when the value of a is not in the neighborhood of one, the expression (7) is not satisfied and the minimum value of the difference response waveform hi(t) is not superimposed at an identical point for the accumulation of logical delay difference. Consequently, the alignment jitter is not so much accumulated as compared with the case of $a \approx 1$.

As above, when the logical delay is in the vicinity of the response time constant of the jitter transfer function, the accumulation of alignment jitter develops the maximum value.

Next, description will be given of a computer simulation conducted to confirm reasonability or acceptability of the analysis above.

Applying the configuration of FIG. 2 to the Chapman model, a character evaluation simulation is achieved for dependence of accumulation of alignment jitter on the logical delay. In this simulation, the systematic jitter is generated in the form of a pulse pattern with a repetition frequency 32,768 (TS) in each node. In consequence, the equalizer employed as a jitter generating source in FIG. 2 is not used in the simulation system. Moreover, the delay D considered in the model of FIG. 2 is assumed to be missing (D=0) in this simulation.

Figure 6A:
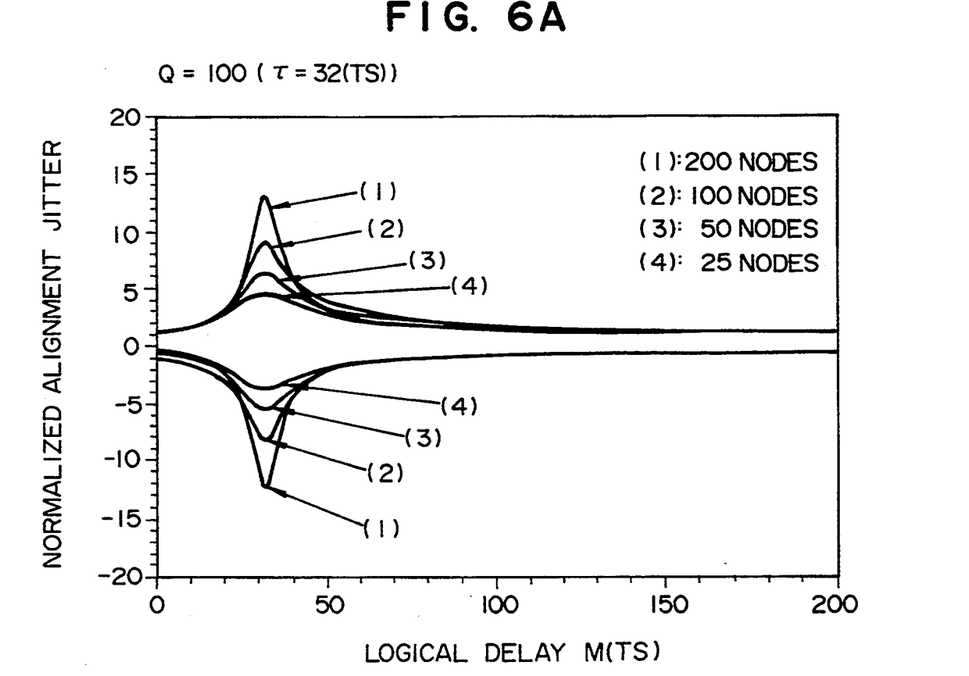
FIGS. 6A and 6B are graphs showing results of computer simulation of dependence of alignment jitter accumulation on logical delay.
Figure 6B:
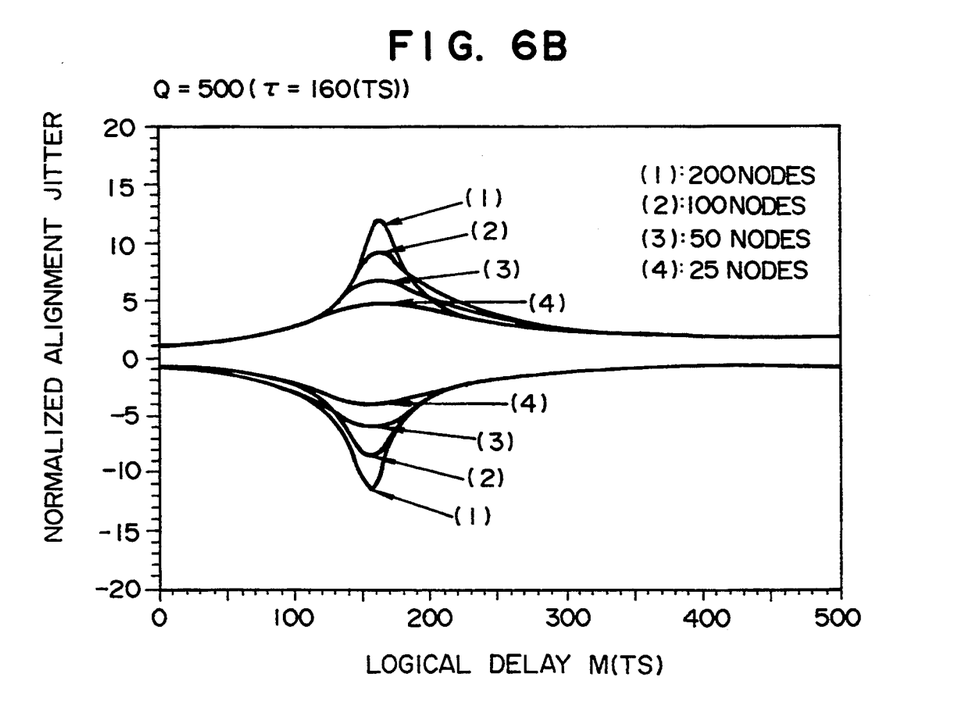
Figure 7A:
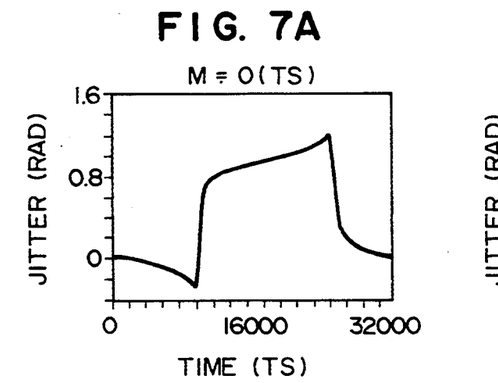
FIGS. 7A to 7C and 8A to 8C are graphs showing computed results of waveforms of alignment jitter accumulation.
Figure 7B:
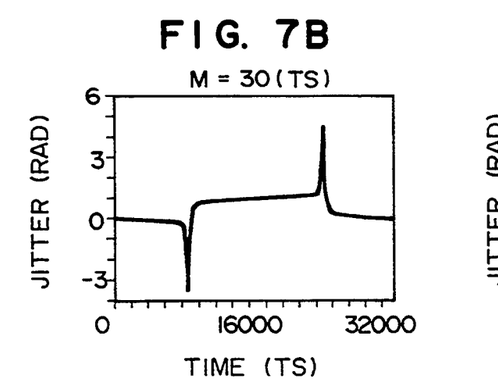
Figure 7C:
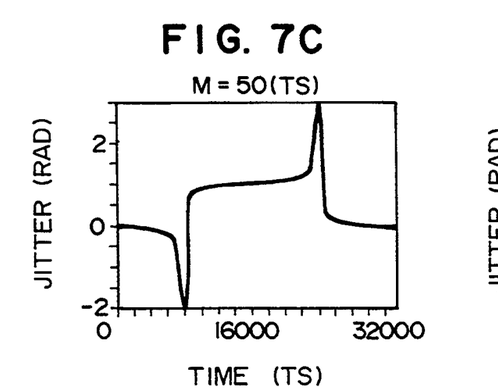
Figure 8A:
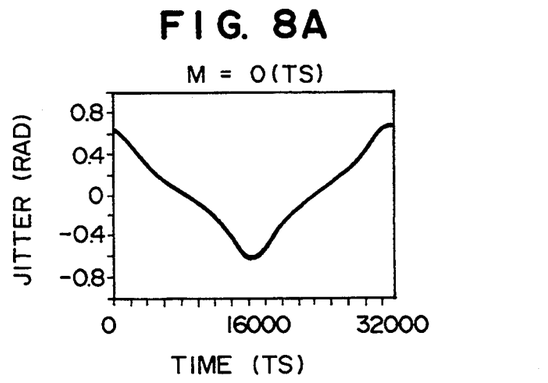
Figure 8B:
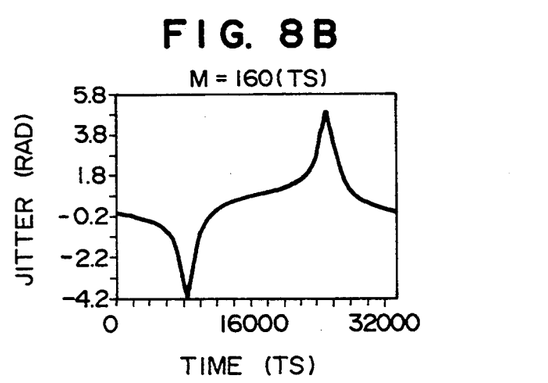
Figure 8C:
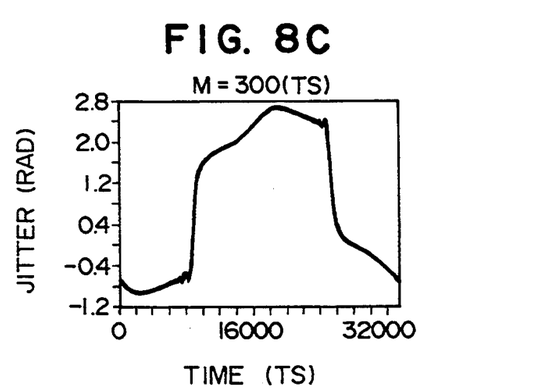

FIGS. 6A and 6B show simulation results obtained under conditions of Q=100 (equivalent to $\tau$=32 (TS)) and Q=500 (equivalent to $\tau$=160 (TS)).

The abscissa and ordinate respectively stand for the logical delay quantity M (TS) and the alignment jitter normalized according to the peak-to-peak value in the first-stage node and the number of repeater nodes being set as a parameter for computation. In both cases of Q=100 and Q=500, particularly, in the proximity of M=$\tau$, the accumulation of alignment jitter is remarkably increased as shown in the graph. Moreover, the greater is the distance between M and $\tau$, the smaller is the accumulation of jitter due to the increase in the number of repeater nodes. There can be seen a tendency of saturation of jitter accumulation in association with the increase in the number of repeater nodes.

FIGS. 7A to 7F and FIGS. 8A and 8B show simulation results of waveforms of alignment jitter in the reproduction node, the results being obtained under the simulation conditions (Q=100 and 500) used in the simulation of FIG. 6. FIGS. 7A to 7F and FIGS. 8A and 8B are respectively associated with a case where the number of nodes is 25 and Q is 100 and a case where the number of nodes is 25 and Q is 500. As can be seen from these graphs, in both cases of Q=100 and Q=500, the peak-to-peak (pp) value of alignment jitter takes the maximum value for $M \approx \tau$. When the distance between M and $\tau$ becomes to be greater, the peak-to-peak value of the jitter waveform is decreased. Consequently, to suppress the accumulation of alignment jitter, it is basically necessary that the logical delay time or Q is set to a value such that the logical delay time is sufficiently apart from the response time constant of the jitter transfer function.

However, as already described above, when the logical delay time is set to a considerably large value, there arises a problem that the transmission delay of the system is increased. Conversely, setting the logical delay time to a small value is impossible due to restrictions of the hardware system. Moreover, when the value of Q of the timing extraction filter is increased, the signal response delay becomes greater and the characteristic of change in phase with respect to temperature is deteriorated. Conversely, when the value of Q is reduced, the out-band noise becomes to be greater, which hence causes the random jitter to increase.

In order to solve these problems, according to the present invention, a delay circuit (element) 6 having a fixed or variable delay time is connected to the timing extraction circuit 3 as shown in FIGS. 1 and 2, thereby equivalently reducing the logical delay in the configuration. Moreover, in accordance with the present invention, in the delay circuit 6, the delay time D of the timing signal is determined according to the magnitude of the logical delay time M so as to equivalently set the value of the logical delay M to 0 or a negative value.

Assume that an equivalent logical delay is defined as follows.

$$Me = M - D \qquad (8)$$

According to the present invention, to prevent accumulation of alignment jitter, the delay time of the delay circuit 6 is selected to set the equivalent logical delay Me to be 0 or a negative value. In this case, to set the value of Me to 0, the delay time D of the delay circuit 6 is required to be exactly coincident with the logical delay M and it is not allowed for the delay time D to include any error. Consequently, the setting of Me to 0 is actually quite difficult. On the other hand, setting the value Me to a negative value means that there exists a margin of the selection allowance range for the delay time D, which hence considerably facilitates the designing and fabrication of the reproduction node.

According to the present invention, it is only necessary to substitute, in the graphs of FIGS. 6A and 6B, the logical delay M for Me. It has been already proved that the alignment jitter is not considerably accumulated when the value of Me is other than $\tau$. In consequence, also in a case where Me is negative (D<M), the jitter is not accumulated.

Figure 9:
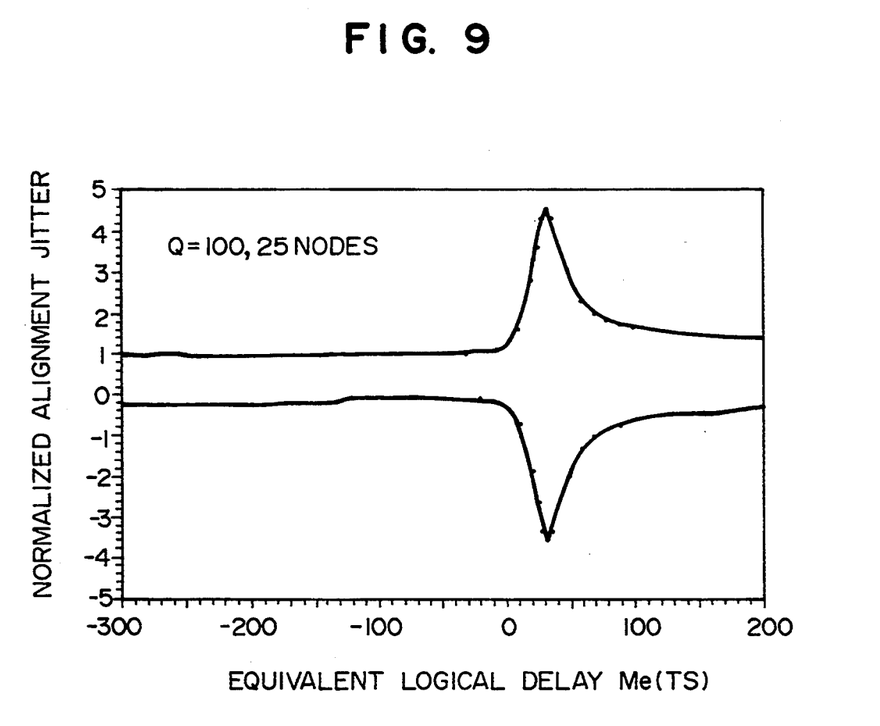
FIG. 9 is a graph showing an example of a computer simulation in which alignment jitter is not accumulated even when the equivalent logical delay takes a negative value.

FIG. 9 shows simulated results of the accumulation characteristic of alignment jitter under conditions of Q=100 and the number of nodes=25. The abscissa and the ordinate respectively designate the equivalent logical delay Me and the value of alignment jitter normalized according to the peak-to-peak value developed in the first node. As can be seen from the simulation results, the alignment jitter is not accumulated when the equivalent logical delay is negative.

As above, the present invention provides a reproduction repeater system in which a fixed or variable delay circuit is inserted into the timing extraction filter to set the equivalent logical delay to a negative value, thereby preventing in principle alignment jitter from being accumulated. The structure of the present invention unnecessitates the conventional requirement that the response characteristic and the delay time of the timing extraction circuit completely match with a predetermined delay time determined by characteristics of the logical circuit. This consequently makes it easy to implement the system. Furthermore, in accordance with the present invention, in order to prevent alignment jitter from being accumulated, the delay quantity of the logic circuit and the designing parameter (Q) of the timing extraction circuit system need not be altered, which consequently facilitates designing of the reproduction node. In addition, when the delay circuit (element) connected to the timing extraction circuit system has a variable delay greater than the logical delay, the reproduction repeater system can easily cope with any change in the quantity of logical delay.

While particular embodiments of the invention have been shown and described, it will be obvious to those skilled in the art that various changes and modifications may be made without departing from the present invention in its broader aspects.

We claim:

1. A transmission system including a plurality of reproduction nodes connected to each other in a cascade connection via a communication line, wherein each of the nodes comprises:

a timing extraction circuit for extracting a timing signal from a signal received via the communication line;

a discriminating circuit for converting the received signal into a digital signal according to the timing signal; and processing means for processing, based on the timing signal, the digital signal outputted from the discriminating circuit and outputting the processed digital signal to the communication line, the timing extraction circuit including signal delay means for supplying the timing signal with a signal delay time greater than a delay time occurring in the processing means.

2. A transmission system according to claim 1, wherein the signal delay time of the signal delay means is variable.

3. A transmission system including a plurality of reproduction nodes connected to each other in a cascade connection via a communication line, wherein each of the nodes comprises:

a timing extraction circuit for extracting a timing signal from a signal received via the communication line;

a discriminating circuit for converting the received signal into a digital signal according to the timing signal;

processing means for processing, based on the timing signal, the digital signal outputted from the discriminating circuit and outputting the processed digital signal to the communication line; and signal delay means connected to the timing extraction circuit for producing a time delay in said timing signal so that a result of an operation of subtracting the signal delay time of the timing extraction circuit from a logical delay time of the processing means has a negative value.

4. A reproduction node of a subordinate synchronization method comprising:

a timing extraction circuit for extracting a timing signal from a signal received from a transmission line to be connected to a reproduction node on the upstream side thereof;

a discriminating circuit for converting the received signal into a digital signal according to the timing signal;

processing means for processing, based on the timing signal, the digital signal outputted from the discriminating circuit and outputting the processed digital signal to a transmission line to be connected to a reproduction node on the downstream side thereof; and signal delay means for delaying the timing signal to be supplied to the discriminating circuit and the processing means by a period of time greater than a signal delay time occurring in the processing circuit.

* * * * *